June 2, 1936.  E. S. KING  2,042,604
PROJECTOR SLIDE
Filed July 8, 1935
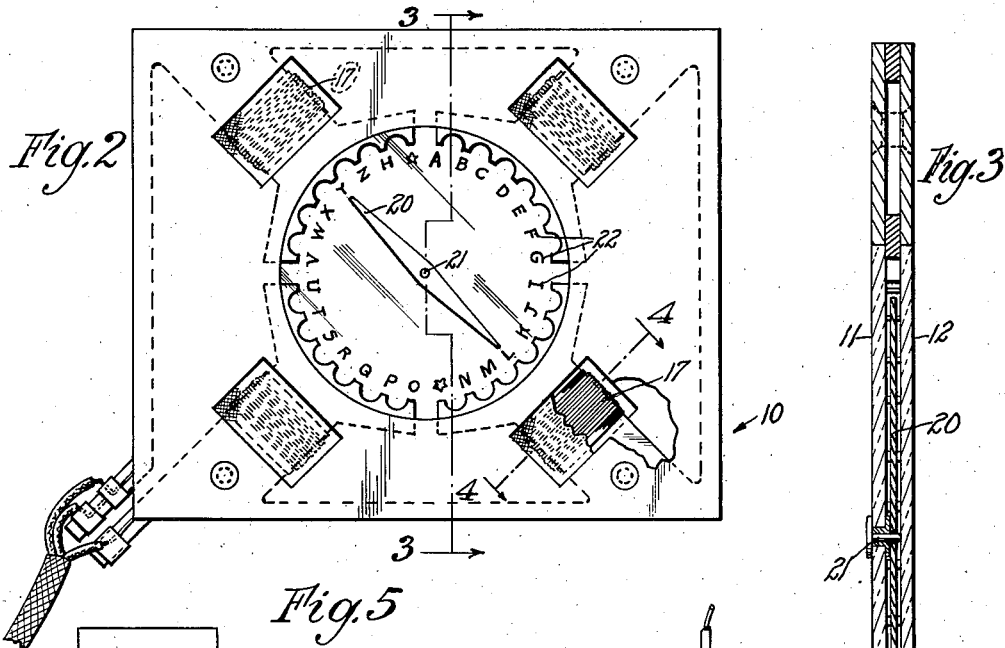
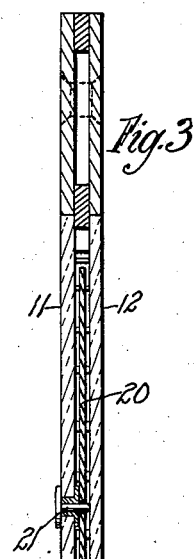
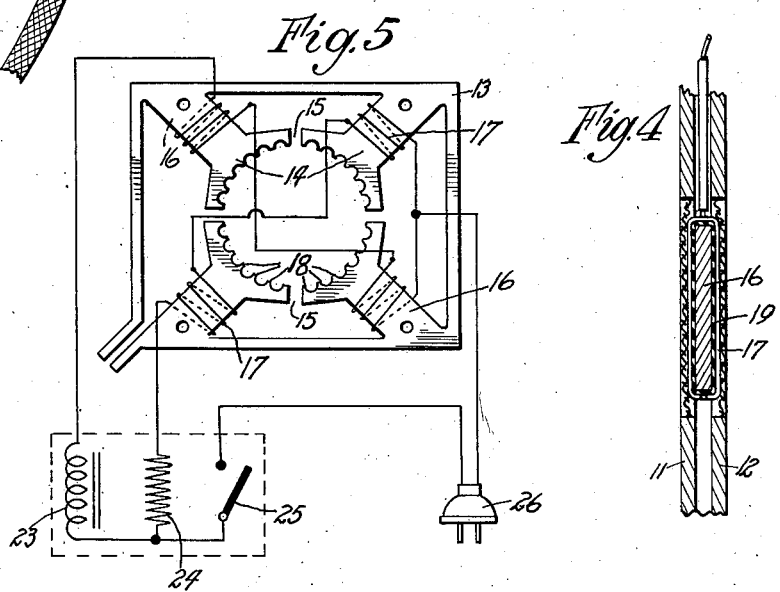
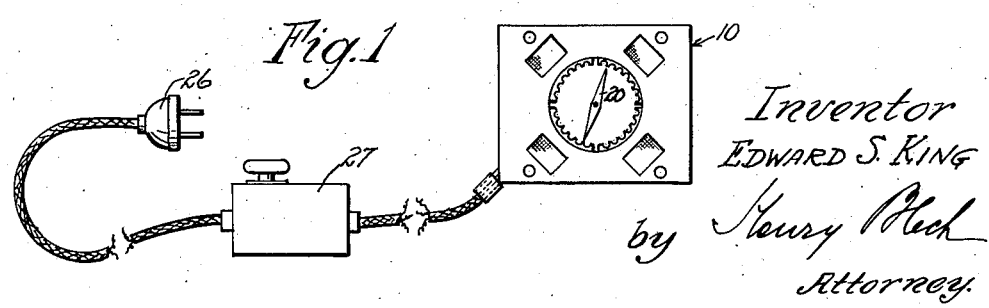

Patented June 2, 1936

2,042,604

UNITED STATES PATENT OFFICE 2,042,604

PROJECTOR SLIDE

Edward S. King, Chicago, Ill.

Application July 8, 1935, Serial No. 30,225

7 Claims. (Cl. 273—141)

The invention relates to projector slides and particularly concerns a slide where a hand or spinner is caused to rotate and the movement of such spinner may be observed upon a screen.

It is an object of the invention to provide a slide of the type set forth which is of simple and inexpensive construction and yet efficient in operation.

A further object aims at providing a slide wherein the spinner is electrically operated.

A still further object aims at providing a slide wherein the spinner plays over a series of graduations or indexes, there being means to cause the spinner to come to a dead stop opposite an index after the spinner ceases to be actuated.

Other equally important objects will become apparent from a perusal of the invention, which comprises the means described in the following specification, particularly set forth in the claims forming a part thereof and illustrated in the accompanying drawing, in which Fig. 1 is an elevational view of my improved device and associated parts.

Fig. 2 is an enlarged front view of the slide proper.

Fig. 3 is an enlarged section on the line 3—3 of Figure 2.

Fig. 4 is a section on the line 4—4 of Figure 2.

Fig. 5 is a front view of the armature employed for actuating the spinner.

Referring to the several views in the drawing, the slide generally designated by 10 comprises two rectangular transparent plates 11 and 12, which may be of glass or any other transparent material suitable for the purpose for which they are intended. Interposed between the transparent plates is an armature 13 which is of the same configuration as the transparent plates but is provided with stamped out portions to provide poles 14 which are separated by air gaps 15 and are integral with arms 16 stamped out from the armature 13.

The armature 13 has wound around its arm 16 field coils 17 which are interconnected as will be readily seen by reference to Figure 5. Attention is called to the fact that the poles 14 are provided with teeth 18 for a purpose hereinafter referred to. The field coils are insulated from the arm 16 by a layer of insulation 19. A hand 20 adapted to be used as a spinner is secured to the plate 11 by a pivot pin 21 which is adapted to rotate between the poles 14 in the interspace between the transparent plates 11 and 12.

The spinner 20 at its ends is juxtaposed to a circle of graduations or marks 22, which marks are adjacent to the teeth of the poles but are placed on the plate 11 or 12. The armature 13 constitutes a stator whereas the spinner 20 constitutes a rotor so that when a field of rotating magnetism is created by the stator the spinner 20 is caused to whirl or rotate and upon the magnetic field ceases to exist, the hand will stop dead in a position where its ends are adjacent to the teeth of opposite poles. The field coils 17 are connected in series through an induction coil 23 and in the circuit is provided a resistance 24 and a switch 25 whereby the circuit is closed and opened at will. The circuit also contains a plug 26 which is inserted in a socket constituting the source of electrical energy. The induction coil 23, the resistance 24 and the switch 25 are mounted in a box 27, and for convenient handling of the device. In use the plug 26 is inserted in a socket not shown whereupon a rotating field of magnetism is set up in the field coils provided the switch 25 has been closed, and upon opening of the switch 25 the circuit is opened, the magnetic field ceases to exist and the hand 20 will remain in a position whereby its ends are held to point toward diametrically opposite teeth of opposed poles, so that the hand comes to a dead stop at the predetermined point and does not sway or oscillate. In this dead stop position, the hand points exactly to certain graduations 22.

The device may be used as a chance device or gaming apparatus, and when inserted in a projector the light rays playing upon the screen will enable visibility of the movement of the hand or spinner on the screen, and will furthermore show an exact dead stop of the spinner opposite two diametrically opposed graduations.

The drawing shows a preferred embodiment of the invention, but other modes of actuating the spinner may be used. I, therefore, do not wish to be limited to the details of construction and arrangement as shown, but wish to claim my invention as broadly as the state of the art permits.

I claim:

1. A stereopticon slide comprising a pair of spaced parallel transparent plates, a rotor constituting a hand pivotally secured to one of said plates and capable of rotation between said plates, and electrical means provided in the interspace between said plates for causing said rotor to rotate.

2. A stereopticon slide comprising a transparent plate, a rotor constituting a hand pivotally secured thereto, an induction motor secured to said plate and causing said hand to rotate.

3. A stereopticon slide comprising a pair of spaced transparent plates, a rotor constituting a hand pivotally secured to one of said plates and capable of rotation between said plates, and electrical means arranged between said plates to cause rotation of said hand.

4. A stereopticon slide comprising a pair of spaced transparent plates, a rotor constituting a hand pivotally secured to one of said plates and capable of rotation between said plates and an induction motor arranged between said plates for causing rotation of said hand.

5. A stereopticon slide comprising a pair of parallel spaced transparent plates, a rotor constituting a hand pivotally secured to one of said plates for rotation thereon and a stator arranged between said plates to constitute said hand as a rotor.

6. A stereopticon slide comprising a pair of spaced parallel transparent plates, a rotor constituting a hand pivotally secured to one of said plates and capable of rotation between said plates, electrical means for causing said hand to rotate, and means for causing said hand to come to a dead stop at predetermined points.

7. A stereopticon slide comprising a pair of spaced parallel transparent plates, a rotor constituting a hand pivotally secured to one of said plates and capable of rotation, an induction motor between said plates actuating said hand, and means for causing said hand to come to a dead stop at predetermined points.

EDWARD S. KING.